(12) United States Patent
Ishida

(10) Patent No.: US 11,134,130 B2
(45) Date of Patent: Sep. 28, 2021

(54) SYSTEM AND MANAGEMENT SERVER

(71) Applicant: CANON KABUSHIKI KAISHA, Tokyo (JP)

(72) Inventor: Tomoya Ishida, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/520,757

(22) Filed: Jul. 24, 2019

(65) Prior Publication Data
US 2020/0036805 A1  Jan. 30, 2020

(30) Foreign Application Priority Data

Jul. 30, 2018 (JP) .............................. JP2018-142388

(51) Int. Cl.
*H04L 29/08* (2006.01)
*G06Q 30/02* (2012.01)
*H04L 29/06* (2006.01)

(52) U.S. Cl.
CPC ......... *H04L 67/26* (2013.01); *G06Q 30/0239* (2013.01); *H04L 67/146* (2013.01); *H04L 67/42* (2013.01)

(58) Field of Classification Search
CPC ....... H04L 67/26; H04L 67/146; H04L 67/42; G06Q 30/0239

USPC .......................................................... 709/217
See application file for complete search history.

(56) References Cited

U.S. PATENT DOCUMENTS

| | | | |
|---|---|---|---|
| 2008/0147645 A1* | 6/2008 | O'Malley | ............. G06F 16/954 |
| 2013/0084896 A1* | 4/2013 | Barkie | .................. H04W 12/10 |
| | | | 455/466 |
| 2016/0086241 A1* | 3/2016 | Proulx | .................... H04L 67/26 |
| | | | 705/26.4 |
| 2016/0315902 A1* | 10/2016 | Silva | ...................... H04W 4/21 |
| 2018/0174192 A1* | 6/2018 | Carolan | ............. G06Q 30/0267 |
| 2018/0278569 A1* | 9/2018 | Lim | ..................... G06Q 20/425 |
| 2019/0104190 A1* | 4/2019 | Justin | ...................... H04L 67/26 |
| 2020/0111137 A1* | 4/2020 | Tsuda | ...................... G09F 19/00 |

FOREIGN PATENT DOCUMENTS

JP   2017-68574 A   4/2017

* cited by examiner

*Primary Examiner* — Kevin T Bates
*Assistant Examiner* — Chen-Liang Huang
(74) *Attorney, Agent, or Firm* — Canon U.S.A., Inc. IP Division

(57) ABSTRACT

A management server generates push notification information based on first identification information that is commonly used in a plurality of push notifications and second identification information for identifying each of the push notifications.

16 Claims, 15 Drawing Sheets

FIG. 5

```
{
  "campaignId":"ca0001",
  "notificationId":"no0001",
  "date":"2017/08/01 15:00",
  "message":"UNTIL AUGUST 31! 30% OFF ON POPULAR HARDCOVERS",
  "campaignURL":"https://www.hogehogexxxxxx.com/campaign/0001/index.html",
  "devices:":{
      "AAAAAAA",
      "BBBBBBB",
      "CCCCCCC"
  }
}
```

FIG. 6

```
{
  "campaignId":"ca0001",
  "notificationId":"no0002",
  "date":"2017/08/30 15:00",
  "message":"ONE DAY UNTIL END OF PROMOTION! 30% OFF ON POPULAR HARDCOVERS",
  "campaignURL":"https://www.hogehogexxxxxx.com/campaign/0001/index.html",
  "devices:":{
      "AAAAAAA",
      "BBBBBBB",
      "CCCCCCC"
  }
}
```

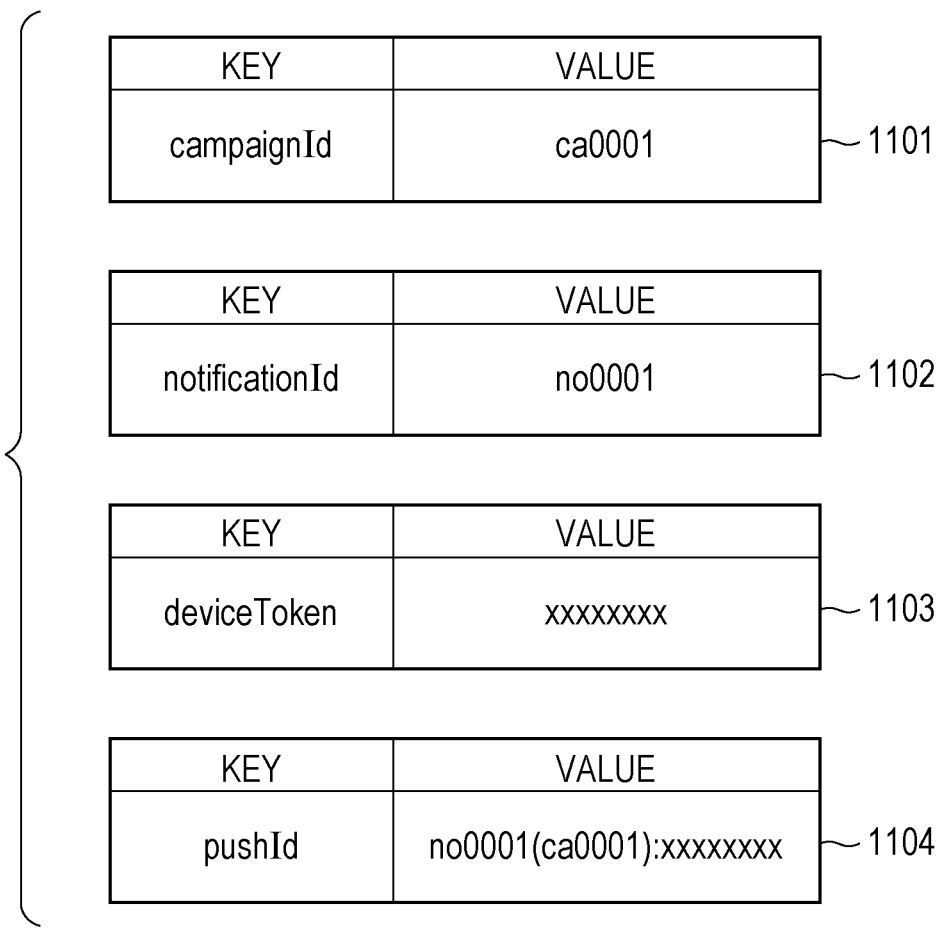

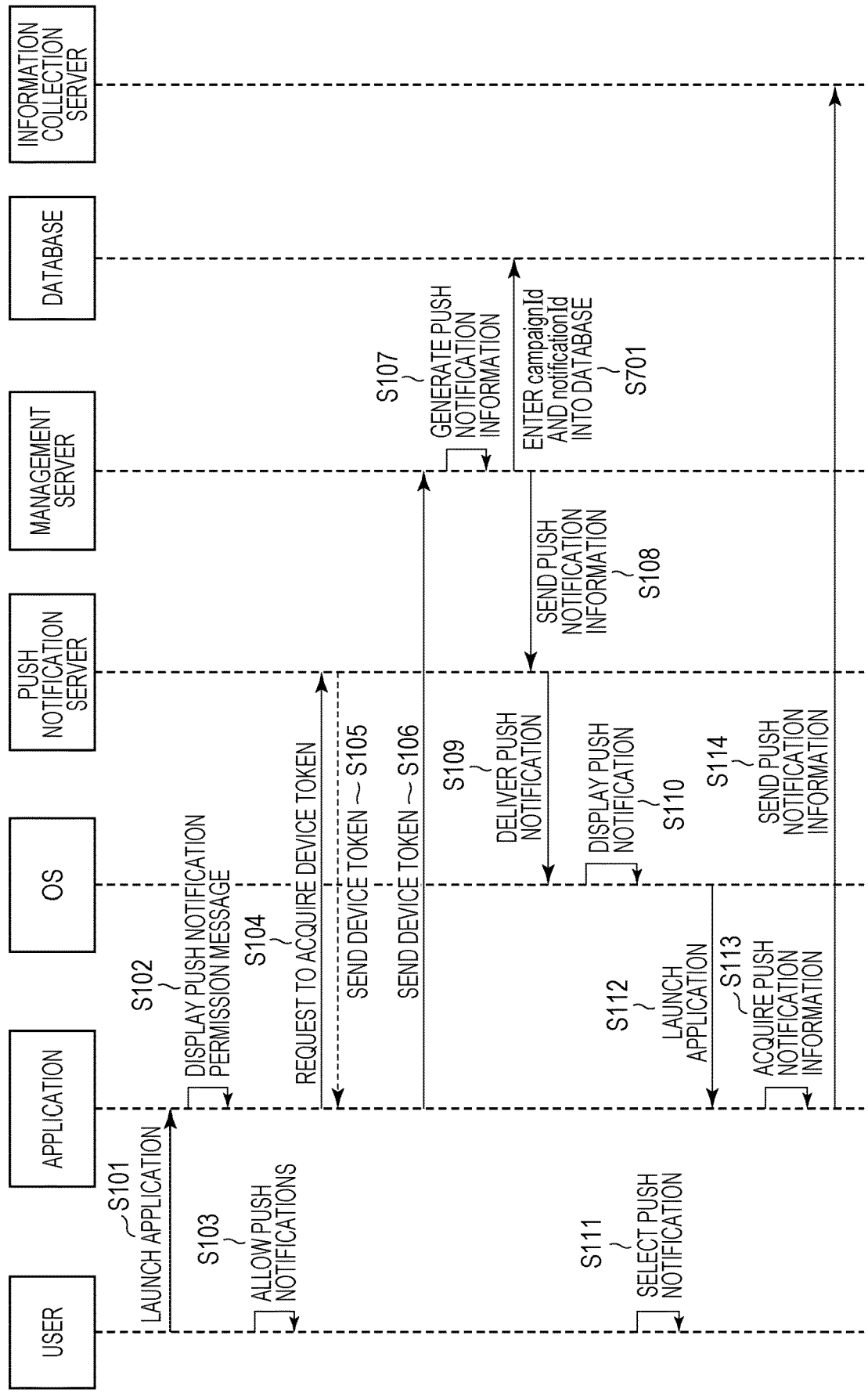

SYSTEM AND MANAGEMENT SERVER

BACKGROUND

Field

The present disclosure relates to a system and a management server.

Description of the Related Art

Some applications that run on smartphones or personal computers have the function of providing a notification of information regarding a promotion, maintenance, or other aspects, of a service intended for the application from a server to the application (hereinafter, referred to as push notification). Information pertaining to a push notification is displayed on a smartphone or application that has received the notification. When a user performs an operation, such as tapping or clicking, on the notification information, the details of the push notification are displayed on the intended application.

Japanese Patent Laid-Open No. 2017-68574 describes sending of a push notification that contains error notification information and print completion notification information.

However, Japanese Patent Laid-Open No. 2017-68574 does not consider techniques for efficiently aggregating user operations on push notifications.

SUMMARY

The present disclosure describes a system that efficiently aggregates user operations on push notifications.

Various embodiments of the present disclosure provide a system including at least one information processing device, a management server, and an information collection server. The management server includes a generating unit configured to generate push notification information based on first identification information that is commonly used in a plurality of push notifications and second identification information for identifying each of the plurality of push notifications, and a sending unit configured to send the generated push notification information. The at least one information processing device includes a receiving unit configured to receive the push notification information, a display control unit configured to display a display screen based on the push notification information, and a sending control unit configured to, when a user operation is performed on the display screen, send response information based on the first identification information and the second identification information. The information collection server includes a determining unit configured to determine a status of operations on the display screen based on the push notification information associated with the first identification information, based on the response information.

Further features will become apparent from the following description of exemplary embodiments with reference to the attached drawings.

BRIEF DESCRIPTION OF THE DRAWINGS

FIG. 5 is a view that shows information pertaining to the push notification in the system.

FIG. 6 is a view that shows information pertaining to the push notification in the system.

FIG. 11 is information that the application sends to the information collection server.

FIG. 17 is a sequence diagram of the system.

DESCRIPTION OF THE EMBODIMENTS

Hereinafter, exemplary embodiments will be described in detail with reference to the attached drawings. The following embodiments do not limit the scope of embodiments of the present disclosure, as recited in the claims. Not all combinations of features that are described below in describing the embodiments are required in all embodiments of the present disclosure.

First Embodiment

Figure 1:
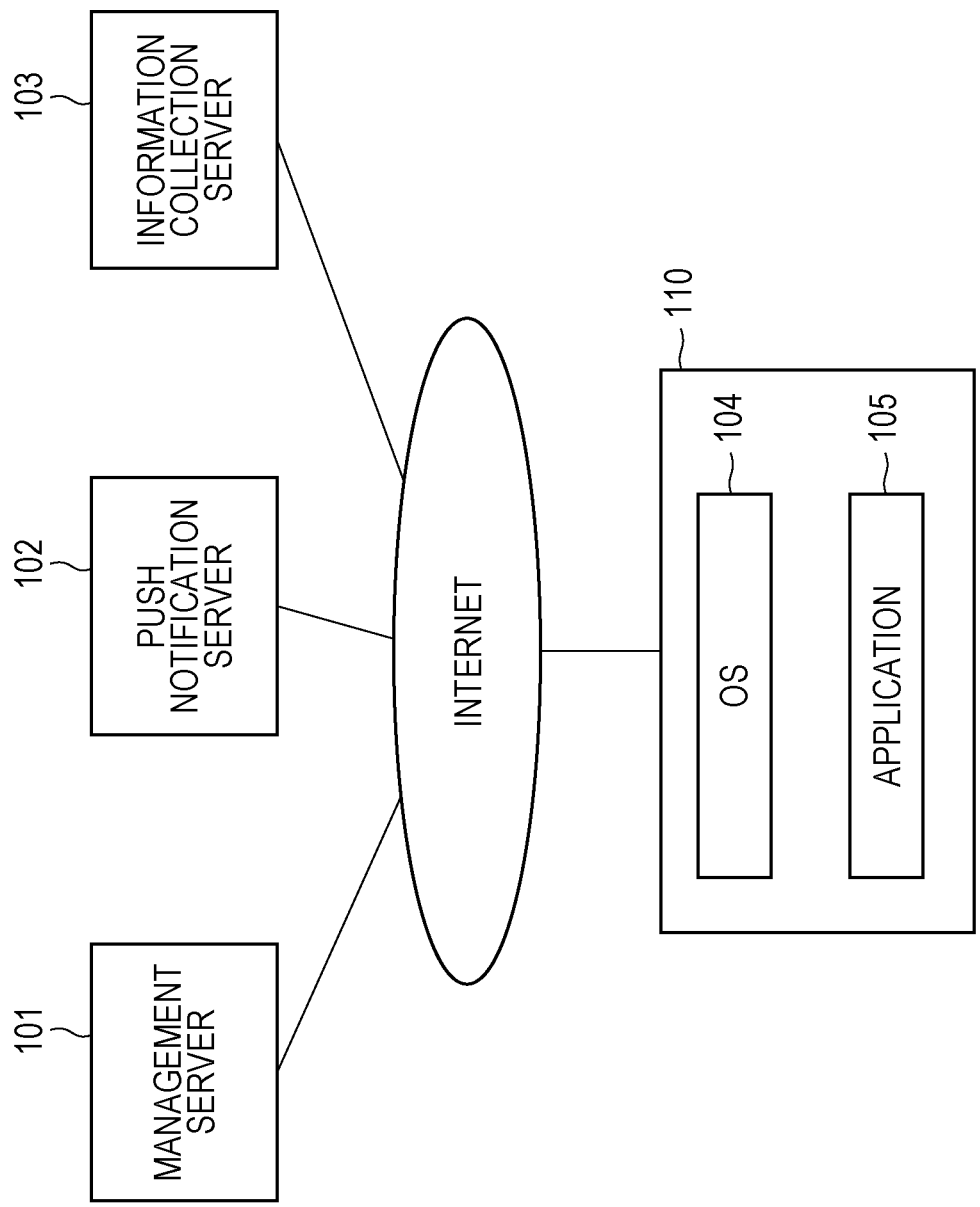
FIG. 1 is a diagram that shows the configuration of a system.

FIG. 1 is a diagram that shows the configuration of a system. The system of the present embodiment is made up of a management server 101, a push notification server 102, an information collection server 103, and an information processing device (also referred to as terminal) 110. The management server 101 is a server for managing what kind of push notification is provided and which terminal the push notification is provided to. Service providers that send push notifications determine what kind of push notification is provided, which terminal the notification is provided to, and when the notification is provided, by operating a dashboard or another interface that is provided by the management server 101. The push notification server 102 is a server for delivering push notifications to the terminals of users. Upon receiving permission for a push notification from the terminal of a user through a push notification permission message (described later), the push notification server 102 issues a device token for identifying a delivery destination of the push notification to the terminal of the user. In addition to a device token, information required for a push notification, that is, push notification information, such as a promotion ID, a delivery date and time, and text of the push notification, is set by the management server 102, or others. The push notification server 101 delivers the push notification to the terminal of the user based on these pieces of information. The information collection server 103 is a server for receiving notification open information of push notifications or information pertaining to the actions, or the like, of users on the applications 105, which are sent by the applications 105.

The information processing device 110 includes an operating system (OS) 104 and the application 105.

Figure 2:
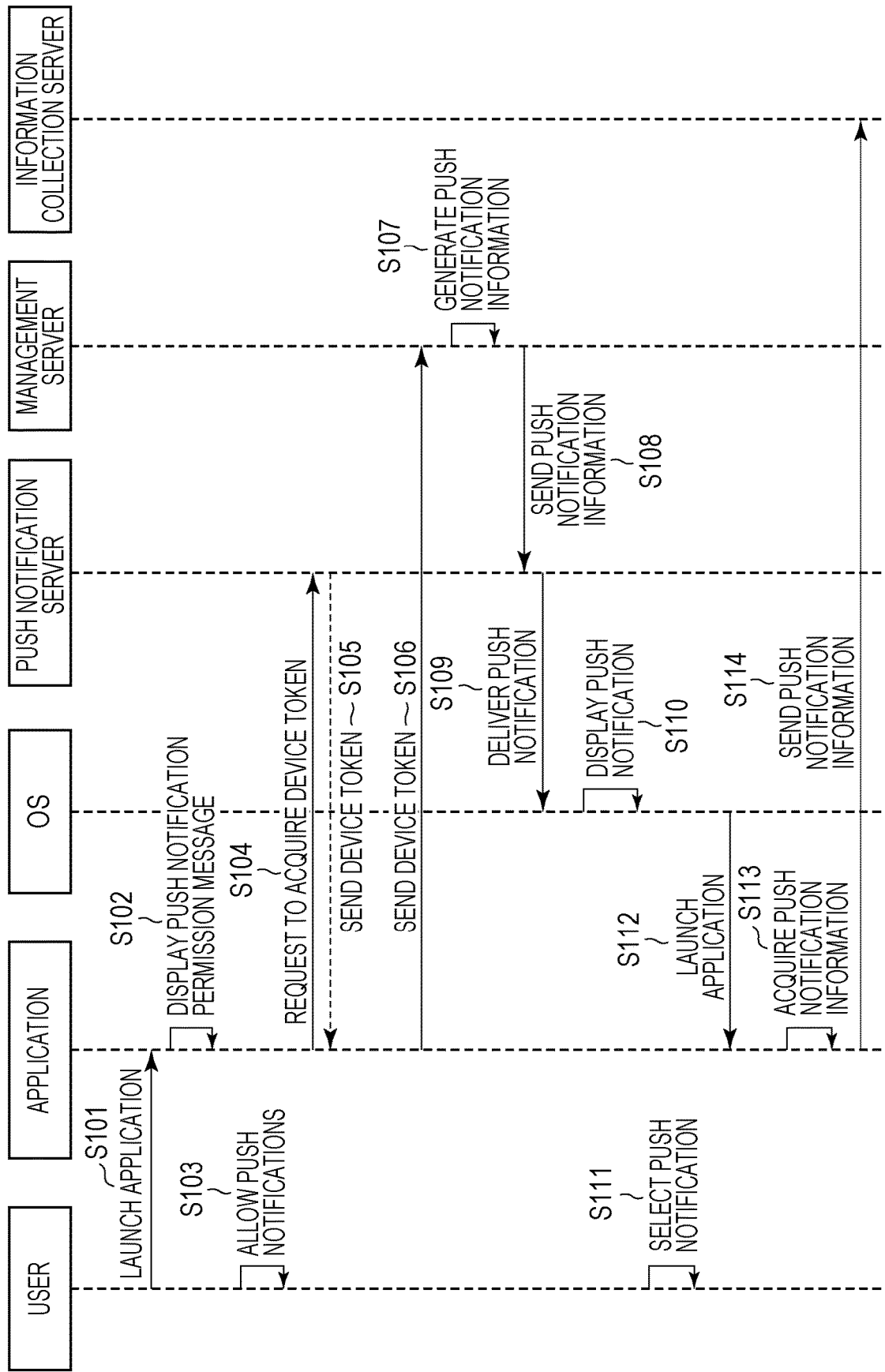
FIG. 2 is a sequence diagram of the system.

FIG. 2 is a sequence diagram of the system. In S101, a user launches the application 105 of an intended service. In S102, the application 105 displays a push notification permission message. The push notification permission message is a message that is displayed when the application 105 that supports push notifications has been launched, and is a message with which the application 105 confirms whether the user actually receives push notifications. Whether such a message is displayed depends on the specifications of the system such as the OS 104. Depending on the system, the application 105 is allowed to receive push notifications even when no push notification permission message is displayed. When a setting screen for setting the operation of the application 105 is prepared in a setting screen of the system such as the OS 104, the user may use the setting screen of the system and set whether the application 105 allows push notifications. In S103, the user selects permission on the push notification permission message that is displayed in S102. As a result, the intended application 105 is allowed to receive push notifications. In S104, the application 105 requests a device token from the push notification server 102. It is assumed that the application 105 has the address information of the push notification server 102 in advance. S104 is executed when push notifications are allowed in S103. A device token is an ID for identifying a terminal to which the push notification server 102 sends push notifications. In S105, the push notification server 102 sends a device token to the application 105. It is assumed that the application 105 has the address information of the management server 101 in advance. In S106, the application 105 sends the device token to the management server 101. The management server 101 sets which terminal to provide push notifications based on the device token. In S107, the management server 101 generates push notification information required to provide a push notification. The push notification information is prepared on a dashboard that is provided by the management server 101. The management server 101 has a dashboard with a user interface for setting what kind of push notification is provided, which terminal the notification is provided to, and when the notification is provided. Setting of a push notification can be performed on the dashboard. For example, with the use of the screen shown in FIG. 3 as will be described later, service providers set push notifications. In S108, the management server 101 sends the push notification information to the push notification server 102. In S109, the push notification server 102 delivers a push notification to the OS 104. The push notification is provided based on the push notification information sent in S108. The push notification information contains a delivery date and time and information that identifies intended devices, which are illustrated in FIG. 5 or other figures. The push notification server 102 determines the timing and intended devices to deliver a push notification based on these pieces of information.

In S110, the OS 104 receives the push notification, and the OS 104 executes a display control process of displaying the details of the push notification. That is, a display screen based on the push notification information is displayed on the terminal 110 that has received the push notification information.

In S111, the user selects the push notification by, for example, tapping or clicking on the display of the push notification. In S112, when the user selects the display of the push notification in S111, the OS 104 launches the application 105. In S113, the application 105 acquires the push notification information from the OS 104. When the application 105 has not been launched in the step of S111, the application 105 is launched by the OS 104 in S112. However, when the application 105 has been already launched in the step of S111, S112 is skipped. When the application 105 has been already launched in the step of S111, the application 105 acquires the push notification information from the OS 104. In S114, the application 105 executes a sending control process of sending the push notification information to the information collection server 103. It is assumed that the application 105 has the address information of the information collection server 103. The information collection server 103 gets the application 105 to, at the time when the application 105 sends information to the information collection server 103, send an ID that identifies the user or terminal to aggregate information on a user-by-user basis or on a terminal-by-terminal basis. Such an ID that identifies a user or terminal is referred to as client ID. Examples of the client ID include the advertising identifier (IDFA) of iOS (registered trademark) and the advertising identifier of Android (registered trademark). Examples of the client ID also include an original ID that the application 105 issues and an ID that a user authentication system issues. When such client IDs are sent to the information collection server 103, information can be aggregated on a user-by-user basis or on a terminal-by-terminal basis. That is, the push notification information that is sent in S114 of the present embodiment contains a client ID in addition to information that will be described later with reference to FIG. 7. In S114, the push notification information is sent when the user performs an operation on the displayed push notification, so the push notification information may also be called response information. Response information that is sent in the first embodiment at least contains a promotion ID, a notification ID, and a client ID, which will be described later in FIG. 7.

Figure 3:
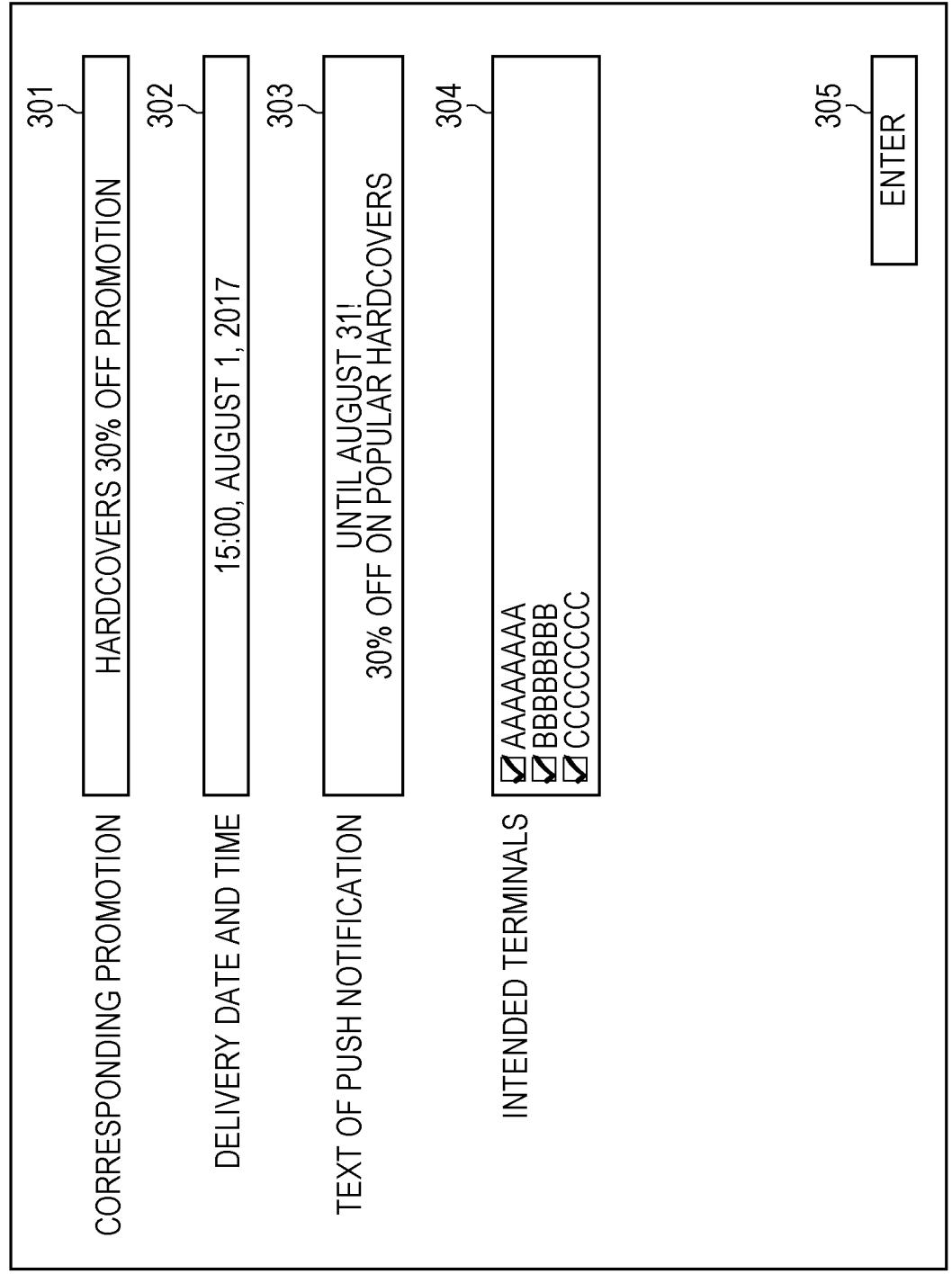
FIG. 3 is a view that shows a screen with which a push notification is set in the system.
Figure 4:
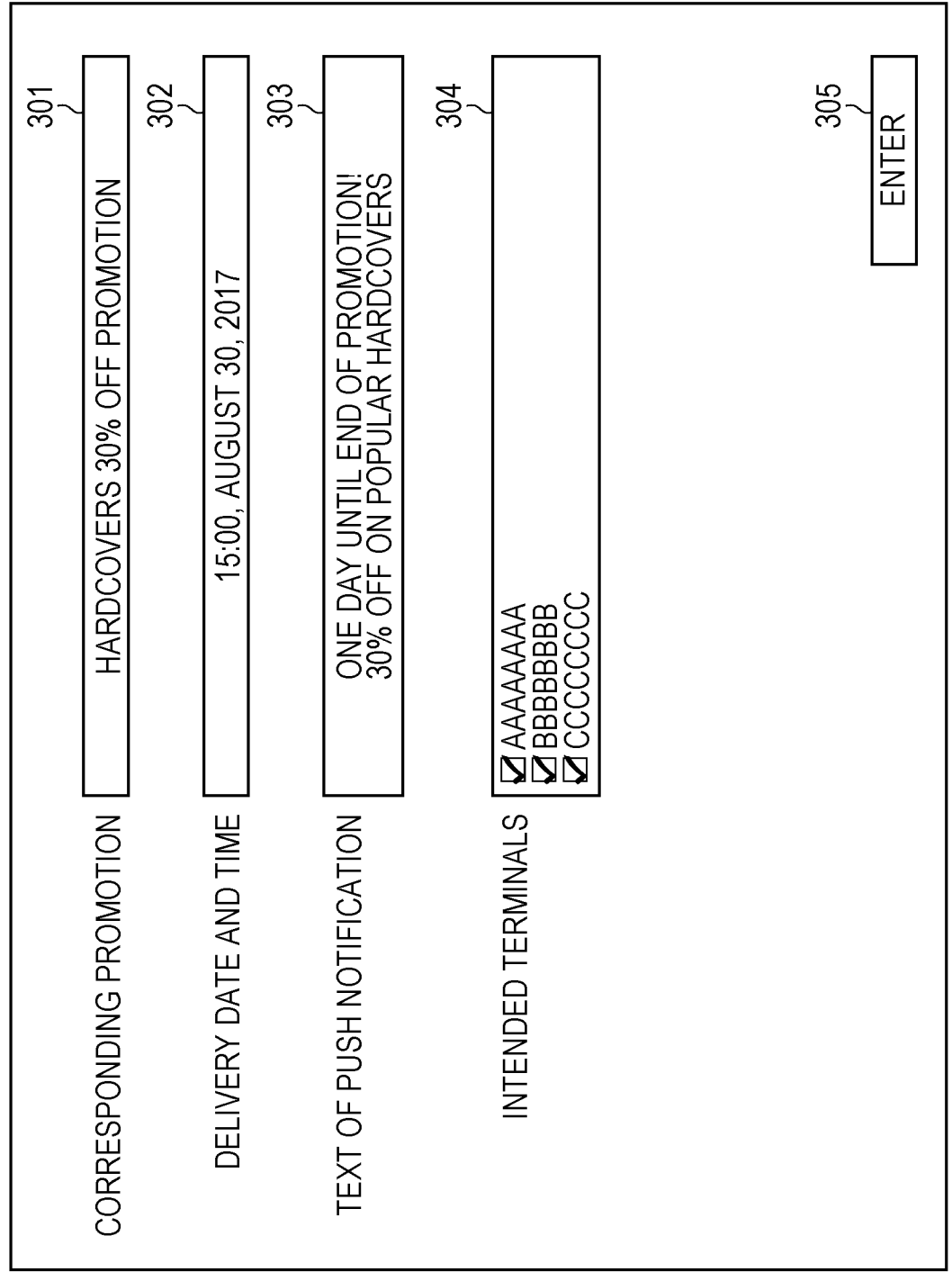
FIG. 4 is a view that shows a screen with which a push notification is set in the system.

FIG. 3 and FIG. 4 are examples of management screens regarding settings for providing a plurality of push notifications to the same promotion.

FIG. 3 is the management screen for push notifications. The management server 101 prepares the management screen. Service providers set a push notification on this management screen, and determine a push notification of what kind of promotion is provided, which terminal the notification is provided to, and when the notification is provided. The reference numeral 301 denotes a field to set a promotion to which a push notification corresponds. The promotion "HARDCOVERS 30% OFF PROMOTION" is set as an example. Promotion IDs for identifying promotions are allocated to the promotions. For example, it is assumed that the promotion ID "ca0001" is allocated to the promotion "HARDCOVERS 30% OFF PROMOTION". The reference numeral 302 denotes a setting field to determine a delivery date and time at which the push notification is delivered. The date and time "15:00, AUGUST 1, 2017" is set as an example. The reference numeral 303 is a field to set text that is displayed on a terminal when the push notification is delivered. The text "UNTIL AUGUST 31! 30% OFF ON POPULAR HARDCOVERS" is set as an example. The reference numeral 304 denotes a setting field to set terminals to which the push notification is sent. Information of device tokens that the applications 105 hand to the management server 101 is displayed in this setting field 304. The reference numeral 305 denotes an enter button to enter the pieces of information, set in the fields 301 to 304. When the enter button is pressed, the pieces of information, set in the fields, are sent to the push notification server 102, and the push notification as set in the fields is provided. In this example, the push notification is delivered to the intended terminals at 15:00 on August 1, 2017, and the text "UNTIL AUGUST 31! 30% OFF ON POPULAR HARDCOVERS" is displayed on the terminals that allow push notifications. When a user taps or clicks on the notification, the user is guided to the URL, or the like, of the promotion corresponding to "HARDCOVERS 30% OFF PROMOTION", and can learn the details of the promotion.

FIG. 4 is the management screen for push notifications. Setting fields are the same as those of FIG. 3; however, the push notification is set in the field of 302 so as to be delivered at 15:00 on August 30, 2017 that is the day before the end of the promotion. In addition, the text of the push notification is different from that of FIG. 3, and is "ONE DAY UNTIL END OF PROMOTION! 30% OFF ON POPULAR HARDCOVERS". When this push notification is entered, the push notification is delivered at 15:00 on August 30, 2017, and the text "ONE DAY UNTIL END OF PROMOTION! 30% OFF ON POPULAR HARDCOVERS" is displayed on the intended terminals. When a user taps or clicks on the notification, the user is guided to the URL, or the like, of the promotion corresponding to "HARDCOVERS 30% OFF PROMOTION", and can learn the details of the promotion.

FIG. 5 shows information pertaining to the push notification (hereinafter, referred to as push notification information) generated based on the set details of FIG. 3. In this example, the information is described in JavaScript Object Notation (JSON) format. The promotion ID corresponding to the promotion set in the field 301 is set for "campaignId" key. The promotion ID is, for example, used commonly in pieces of push notification information that are respectively sent to the three intended terminals. Therefore, the promotion ID can be referred to as common identification information. A notification ID corresponding to each push notification is set for the "notificationId". A delivery date and time set in the field 302 is set for the "date" key. The text of the push notification set in the field 303 is set for the "message" key. The notification ID may be, for example, the same or may be different among the pieces of push notification information that are respectively sent to the three target terminals. Therefore, the notification ID can be referred to as individual identification information. A promotion URL corresponding to the "campaignId" is set for the "campaignURL". Here, "ca0001" is set for the "campaignId" key, "no0001" is set for the "notificationId" key, and "2017/08/01 15:00" is set for the "date" key as date information. In FIG. 5, the text "UNTIL AUGUST 31! 30% OFF ON POPULAR HARDCOVERS" is set for the "message" key as message information. The address "http://www.hogehogexxxxxxxx.com/campaign/0001/index.html" is set for the "campaignURL" key. In FIG. 5, pieces of identification information of the intended terminals that are destinations of the push notification are set for the "devices" key. The thus configured push notification information is sent to the push notification server 102, and the push notification server 102 delivers the push notification to the terminals of the users based on the details of the push notification information. Here, the "campaignId" and the "notificationId" are set as separate keys; however, embodiments of the present disclosure are not limited thereto. For example, a single key like "pushId" may be used, and a combination of strings like "campaignId(notificationId)" may be used as a value. For example, in the example of FIG. 5, the value "ca0001(no0001)" is set for the key "pushId".

FIG. 6 shows push notification information generated based on the set details of FIG. 4. In this example, the information is described in JavaScript Object Notation (JSON) format. An ID corresponding to the promotion set in the field 301 is set for the "campaignId" key, and an ID corresponding to each push notification is set for the "notificationId". A delivery date and time set in the field 302 is set for the "date" key, and the text of the push notification set in the field 303 is set for the "message" key. A promotion URL corresponding to the "campaignId" is set for the "campaignURL". Here, "ca0001" is set for the "campaignId" key, and "no0002" is set for the "notificationId" key. The date and time "2017/08/30 15:00" is set for the "date" key, and the text "ONE DAY UNTIL END OF PROMOTION! 30% OFF ON POPULAR HARDCOVERS" is set for the "message" key. The address "http://www.hogehogexxxxxxxx.com/campaign/0001/index.html" is set for the "campaignURL" key. The intended terminals are set for the "devices" key. The thus configured push notification information is sent to the push notification server 102, and the push notification server 102 delivers the push notification to the terminals of the users based on the details of the push notification information. When FIG. 5 and FIG. 6 are compared with each other, the IDs of the "campaignId" are the same, but the IDs of the "notificationId" key are different. That is, this is an example in which different push notifications are provided for one promotion. Here, the "campaignId" and the "notificationId" are set as separate keys; however, embodiments of the present disclosure are not limited thereto. For example, a single key like "pushId" may be used, and a combination of strings like "campaignId(notificationId)" may be used as a value. For example, in the example of FIG. 6, the value "ca0001(no0002)" is set for the key "pushId".

The push notification information as illustrated in FIG. 5 or FIG. 6 is sent from the management server 101 to the push notification server 102, and the push notification server 102 sends the push notification information to the terminals of the users. As described in S113 of FIG. 2, the application 105 can acquire the push notification information. The push notification information that is acquired in S113 may be the information illustrated in FIG. 5 or FIG. 6 as-is or the information illustrated in FIG. 5 or FIG. 6 may be customized into a form, or the like, suited to the format of the information that the push notification server 102 sends to the OS 104.

Figure 7:
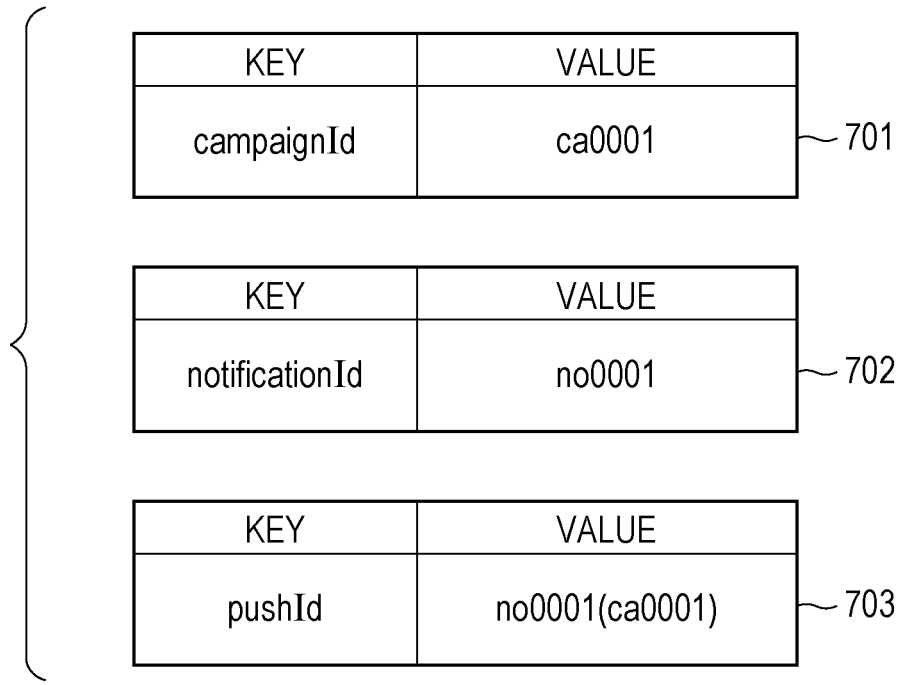
FIG. 7 is information that an application sends to an information collection server.

FIG. 7 is an example of the push notification information that the application 105 sends to the information collection server 103 in S114. What format the application 105 sends the push notification information in depends on the specifications of the information collection server 103. A description will be provided by way of an example in which a set of key and value is sent to the information collection server 103 as a format. FIG. 7 is an example of the case where the application 105 sends the push notification information of FIG. 5 to the information collection server 103. In the format 701, "campaignId" is set for the key, and "ca0001" is set for the value. In the format 702, "notificationId" is set for the key, and "no0001" is set for the value. In the format 703, "pushId" is set for the key, and "no0001(ca0001)" is set for the value. The key "campaignId" and the key "notificationId" are information that the application 105 receives as the push notification information. When "campaignId" and "notificationId" are sent to the information collection server 103, the information collection server 103 can count the number of opens for each of "campaignId" and "notificationId". A string that is a combination of "campaignId" and "notificationId" is set for "pushId". When the string that is a combination of "campaignId" and "notificationId" is sent to the information collection server 103 in this way, the information collection server 103 can learn which promotion each push notification opened corresponds to. In this drawing, the value is described in the format of "campaignId (notificationId)"; however, embodiments of the present disclosure are not limited thereto. The value may be described in another format.

Figure 8:
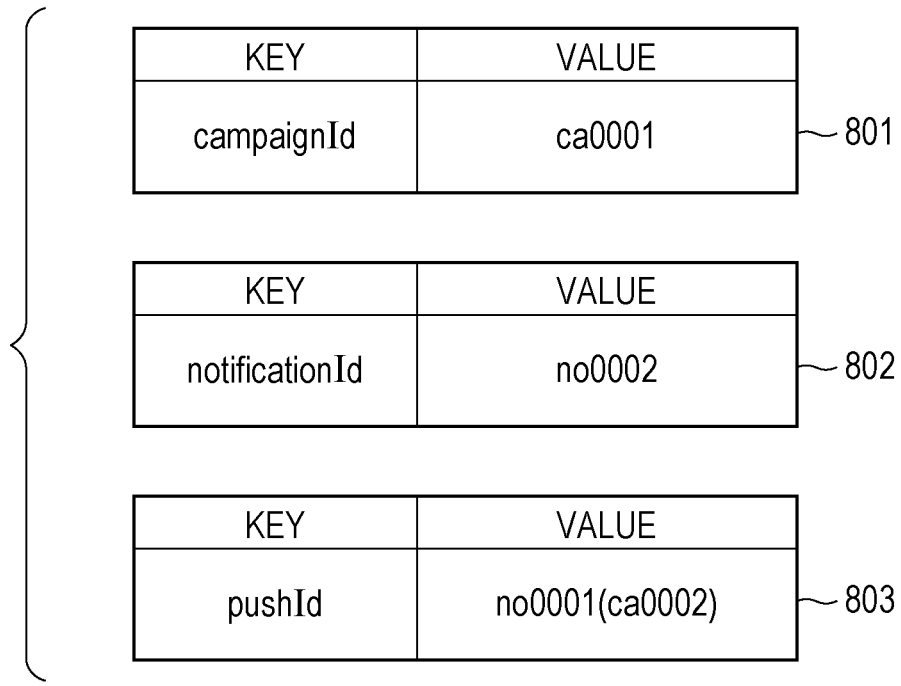
FIG. 8 is information that the application sends to the information collection server.

FIG. 8 is an example in which the application 105 sends the push notification information of FIG. 6 to the information collection server 103 in S114. In the format 801, "campaignId" is set for the key, and "ca0001" is set for the value. In the format 802, "notificationId" is set for the key, and "no0002" is set for the value. In the format 803, "pushId" is set for the key, and "no0001(ca0002)" is set for the value. The key "campaignId" and the key "notificationId" are information that the application 105 receives as the push notification information. When "campaignId" and "notificationId" are sent to the information collection server 103, the information collection server 103 can count the number of opens for each of "campaignId" and "notificationId". A string that is a combination of "campaignId" and "notificationId" is set for "pushId". When the string that is a combination of "campaignId" and "notificationId" is sent to the information collection server 103 in this way, the information collection server 103 can learn which promotion each push notification opened corresponds to. In this drawing, the value is described in the format of "campaignId (notificationId)"; however, embodiments of the present disclosure are not limited thereto. The value may be described in another format, for example.

In FIG. 7 or FIG. 8, information is sent to the information collection server 103 as a set of key and value; however, embodiments of the present disclosure are not limited thereto. The information processing device 110 just needs to send response information to the information collection server 103 in a form suited to the format of the information collection server 103. For example, when the information collection server 103 is able to receive information of a JavaScript Object Notation (JSON) format, the push notification information illustrated in FIG. 5 or FIG. 6 may be sent to the information collection server 103 as-is.

Figure 9A:
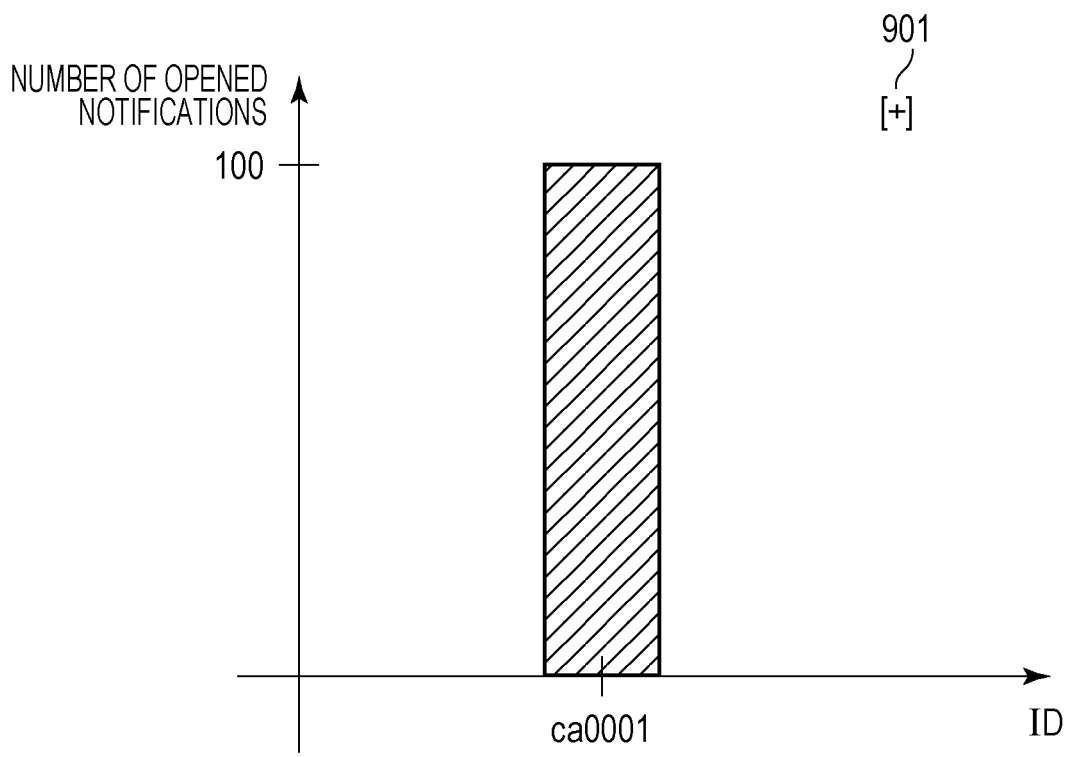
FIG. 9A and FIG. 9B are graphs of information regarding the push notifications, made in the information collection server.
Figure 9B:
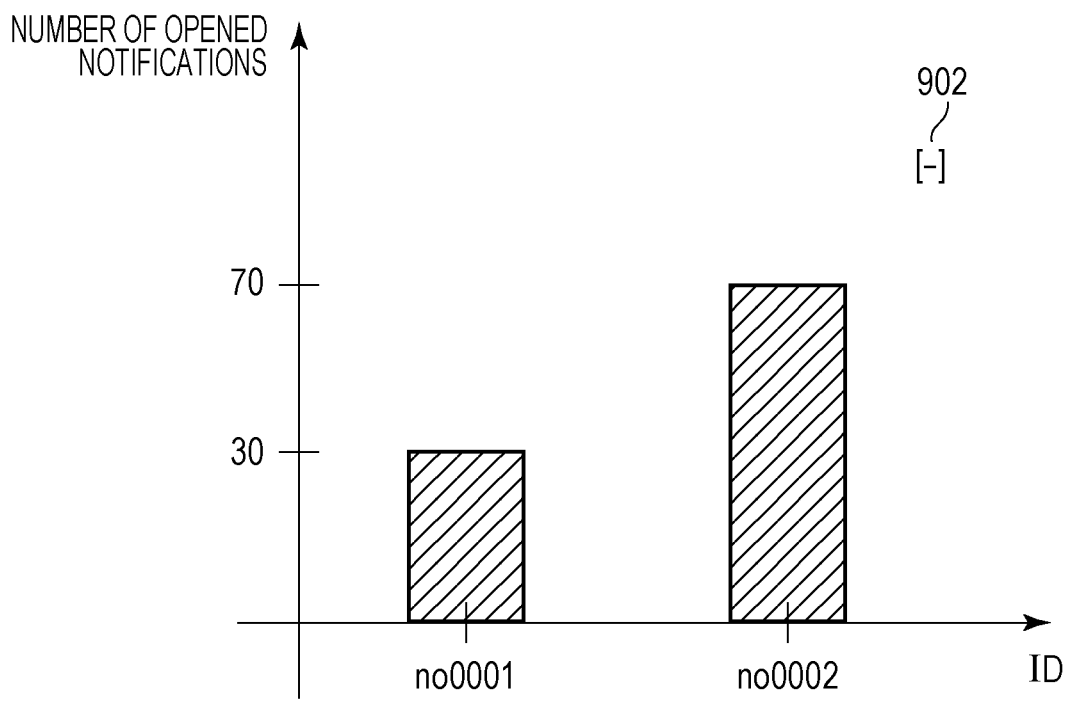

FIG. 9A and FIG. 9B are graphs of information regarding the push notifications, made in the information collection server 103. FIG. 9A and FIG. 9B are graphs of the pieces of information of FIG. 7 and FIG. 8, sent to the information collection server 103. These graphs may be made by the information collection server 103 or may be made by another PC or others being connected to the information collection server 103. FIG. 9A shows the number of opened notifications on a promotion-by-promotion basis, and indicates that the push notification of "campaignId"="ca0001" has been opened 100 times. When a "+" button 901 in FIG. 9A is selected, FIG. 9B is displayed. The screens of FIG. 9A and FIG. 9B are displayed, for example, when service providers input URL to the browsers of the PCs of the service providers.

FIG. 9B shows the number of opened notifications on a notification-by-notification basis, and shows all the push notifications of "campaignId"="ca0001" in a developed view. FIG. 9B indicates that the push notification of "notificationId"="no0001" has been opened 30 times and the push notification of "notificationId"="no0002" has been opened 70 times. The keys "campaignId" and "notificationId" are associated with each other as shown in the format 703 of FIG. 7 or the format 803 of FIG. 8, and sent to the information collection server 103. Therefore, when the graph counted on a promotion-by-promotion basis as shown in FIG. 9A is developed, the notification open information of all the push notifications corresponding to a promotion can be displayed as shown in FIG. 9B. When a "−" button 902 in FIG. 9B is selected, the display screen can be returned to the display of FIG. 9A.

Figure 10A:
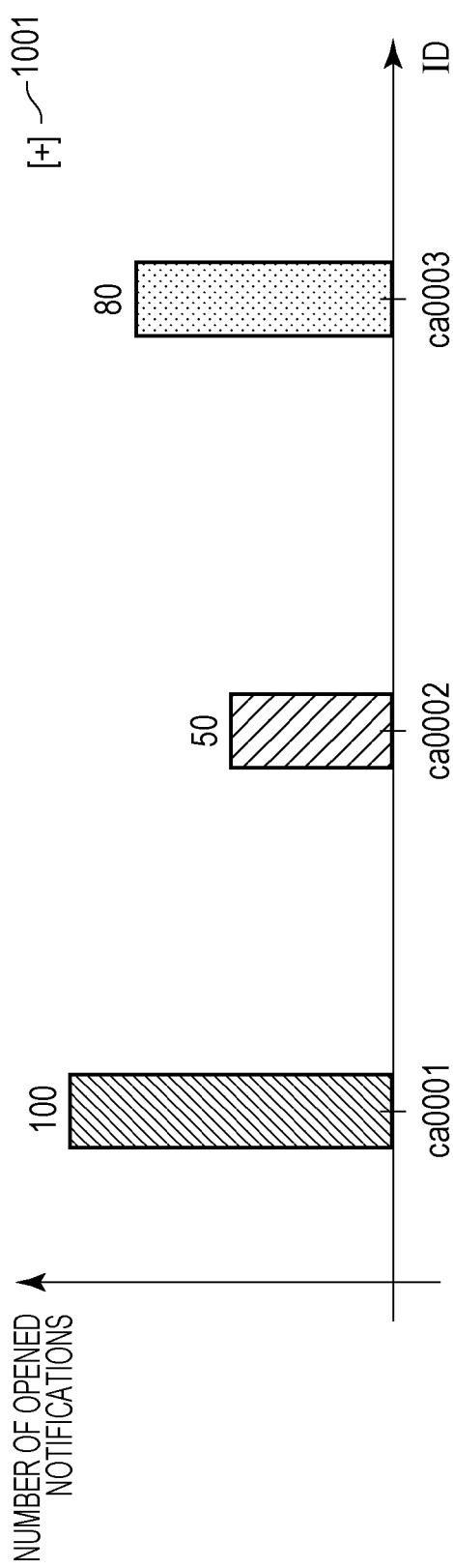
FIG. 10A and FIG. 10B are graphs of information regarding the push notifications, made in the information collection server.
Figure 10B:
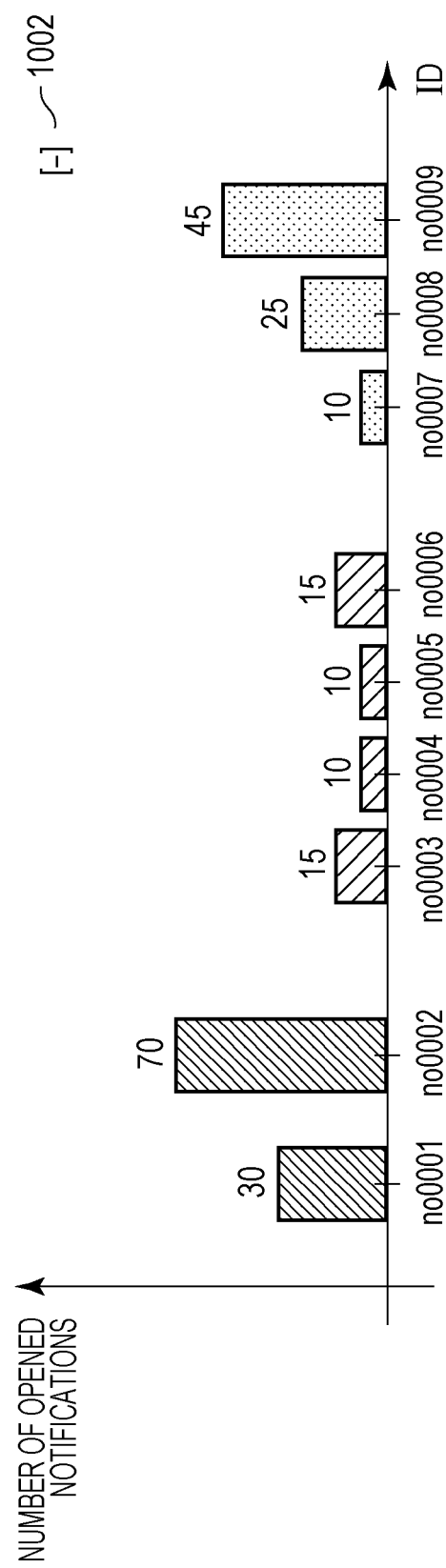

FIG. 10A and FIG. 10B are graphs when the numbers of opened push notifications for a plurality of promotions are counted. FIG. 10A shows the number of opened notifications on a promotion-by-promotion basis. FIG. 10A indicates that the number of opened push notifications for "ca0001" is 100. FIG. 10A also indicates that the number of opened push notifications for "ca0002" is 50 and the number of opened push notifications for "ca0003" is 80. When a "+" button 1001 in FIG. 10A is selected, FIG. 10B is displayed. FIG. 10B shows the number of opened notifications on a notification-by-notification basis, and shows all the push notifications corresponding to each of the promotions shown in FIG. 10A in a developed view. As for the promotion of "campaignId"="ca0001", the IDs of the corresponding push notifications are "no0001" and "no0002", and the numbers of opened notifications are 30 and 70, respectively. As for the promotion of "campaignId"="ca0002", the IDs of the corresponding push notifications are "no0003", "no0004", "no0005", and "no0006", and the numbers of opened notifications are 15, 10 10, and 15, respectively. As for the promotion of "campaignId"="ca0003", the IDs of the corresponding push notifications are "no0007", "no0008", and "no0009", and the numbers of opened notifications are 10, 25, and 45, respectively. The keys "campaignId" and "notificationId" are associated with each other as shown in the format 703 of FIG. 7 or the format 803 of FIG. 8, and sent. Therefore, when the graphs counted on a promotion-by-promotion basis as shown in FIG. 10A are developed, the notification open information of all the push notifications corresponding to each promotion can be displayed as shown in FIG. 10B. When "−" button 1002 in FIG. 10B is selected, the display screen can be returned to the display of FIG. 10A.

In the present embodiment, the management server 101 generates push notification information that contains not only a notification ID but also a promotion ID. Therefore, the information collection server 103 is able to easily determine the status of an operation on push notification information corresponding to a promotion ID based on response information from the information processing device 110. As a result, for example, service providers can easily manage user operations on push notifications on a promotion ID-by-promotion ID basis.

Second Embodiment

Service providers can execute a further additional process based on push notification open information described in the first embodiment. In the present embodiment, the additional process will be described by way of an example.

Figure 12:
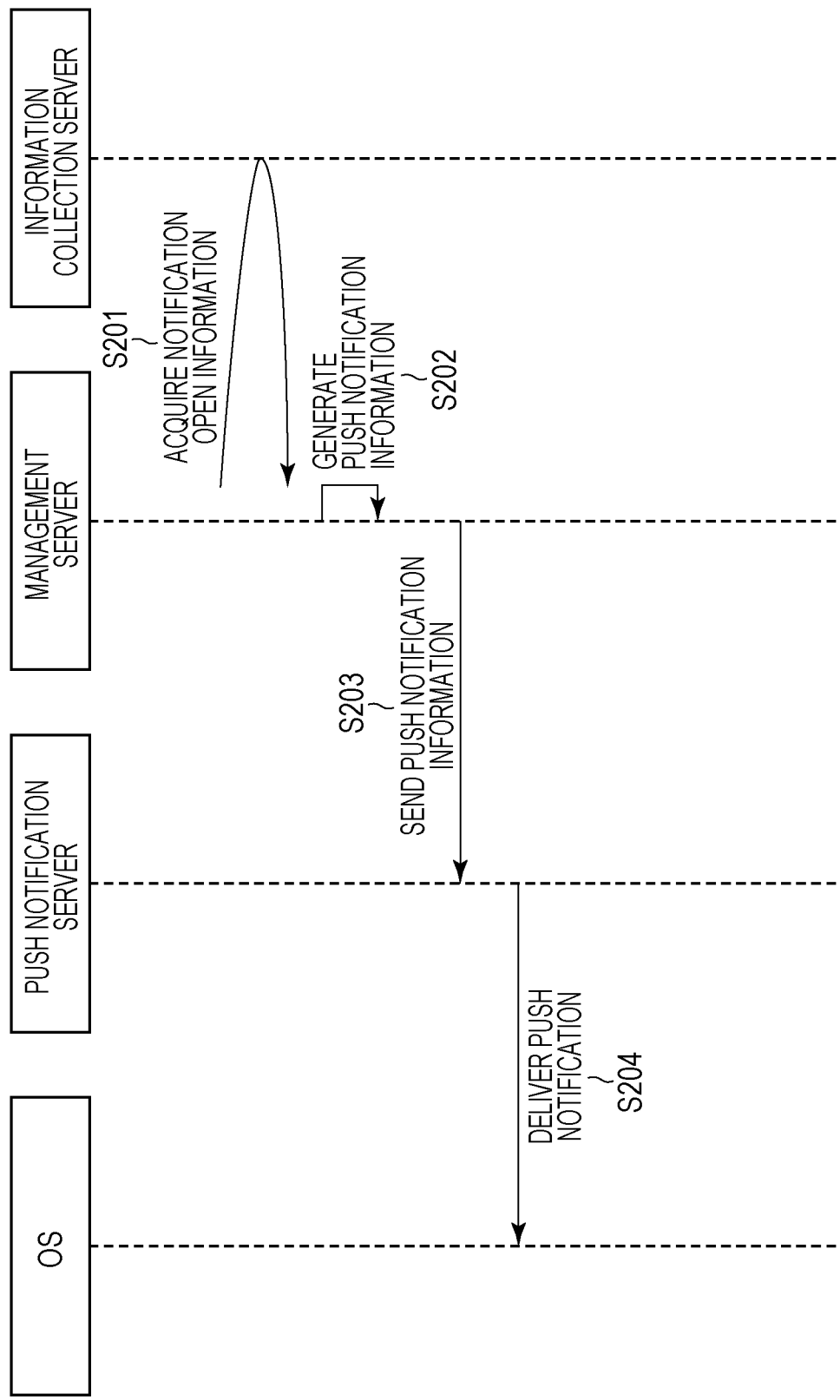
FIG. 12 is a sequence diagram of the system.

FIG. 11 and FIG. 12 are examples when a push notification associated with an intended promotion is provided again to only terminals that have not opened the push notification. When the destinations of a second push notification are limited in this way, a process of providing a second push notification for the same promotion to users that have already opened the push notification for the intended promotion is reduced.

FIG. 11 is an example of push notification information that the application 105 sends to the information collection server 103 in S114. In the format 1101, "campaignId" is set for the key, and "ca0001" is set for the value. In the format 1102, "notificationId" is set for the key, and "no0001" is set for the value. In the format 1103, "deviceToken" is set for the key, and "xxxxxxxx" is set for the value. In the format 1104, "pushId" is set for the key, and "no0001(ca0001):xxxxxxxx" is set for the value. A string that is a combination of "campaignId", "notificationId", and "deviceToken" is set for "pushId". When the string that is a combination of three keys is sent to the information collection server 103, the information collection server 103 can hold the notification open information of push notifications on a terminal-by-terminal basis. In this drawing, the value is described in the format of "campaignId(notificationId):deviceToken"; however, embodiments of the present disclosure are not limited thereto. The value may be described in another format, for example.

FIG. 12 shows a sequence to provide a push notification associated with an intended promotion only to terminals that have not opened the push notification. In S201, the management server 101 acquires the push notification open information from the information collection server 103. The push notification open information is information that is sent from the application 105 and that is shown in FIG. 11, and contains the deviceTokens of the terminals that have opened the push notification. When the management server 101 acquires the information shown in FIG. 11 from the information collection server 103, the management server 101 can learn which terminals have not opened the push notification for the intended promotion. That is, through the process of S201, the management server 101 can acquire operation information that indicates the details of operation of the user on the information processing device 110.

In S202, the management server 101 generates push notification information whose intended terminals have been narrowed down to terminals that have not opened the push notification. For example, the push notification information of FIG. 5 designates three terminals as intended terminals. It is assumed that, of these terminals, only the terminal corresponding to the device token "BBBBBBBB" has not opened the push notification associated with the intended promotion. In this case, in S202, the management server 101 generates push notification information in which only "BBBBBBBB" is set as the destination of notification. That is, in S202, the management server 101 is able to determine the terminal, to which push notification information is sent, based on operation information.

In S203, the management server 101 sends the push notification information generated in S202 to the push notification server 102. In S204, the push notification server 102 delivers the push notification based on the push notification information.

As described above, the management server 101 is able to generate push notification information that is sent at first timing and push notification information that is sent at second timing different from the first timing. The management server 101 is able to determine the terminal, to which the push notification information that is sent at the second timing is sent, based on operation information. The push notification information that is sent at the first timing is, for example, first push notification information that is sent for a promotion. The push notification information that is sent at the second timing is the push notification information that is sent based on the determination that the sent first push notification information has not been opened.

The example in which the push notification associated with the intended promotion is provided to only the terminal that has not opened the push notification is described above; however, embodiments of the present disclosure are not limited thereto. For example, a second push notification associated with an intended promotion may be provided only to users that have opened a first push notification and that have not achieved a goal set by a service provider. To do so, the details of operations of users on the applications 105 are sent to the information collection server 103, and the management server 101 acquires the information. Thus, the management server 101 generates push notification information with intended users narrowed. There are various other examples in which an additional push notification associated with an intended promotion is provided based on the details of operations of users. For example, a service that provides a photo album will be described as an example. When a user sees the price of a photo album and then exits the application 105, the application 105 provides the information collection server 103 with the details of operations, indicating that the page of price information is displayed and then the application 105 is exited. The management server 101 may generate push notification information for other promotion information, in which a device token corresponding to the terminal on which these operations have been performed is set as the destination of notification, by acquiring the details of operations from the information collection server 103 in S201. The case where a user changes the screen to an editing screen for a photo album by operating the application 105 and then exits the application 105 will be described. In this case, the application 105 provides the information collection server 103 with the details of operations, indicating that the editing screen for a photo album is displayed and the application 105 is exited without finishing an editing process. The management server 101 may generate push notification information regarding an operation guide for an editing operation to set a device token, corresponding to the terminal on which the operations are performed, as the destination of notification by acquiring the details of operations from the information collection server 103 in S201. For example, push notification information in which a URL regarding a guide page (operation guide) is set may be generated or an operation guide may be contained in a message. When a user changes the screen to an online cart to pay for a photo album but exits the application 105 without ordering creation of an album, the application 105 provides the details of operations to the information collection server 103. The management server 101 may generate push notification information, in which a device token corresponding to the terminal on which the operations are performed is set as the destination of notification and a promotion code is contained as a message, by acquiring the details of operations from the information collection server 103 in S201. That is, the management server 101 is able to acquire operation information that tells the details of operations of a user on the information processing device 110 and generate push notification information based on the operation information.

Third Embodiment

An option to stop sending push notifications for an intended promotion may be provided, and whether to provide the push notifications may be determined based on whether the option is selected. The embodiment in which subsequent notifications for an intended promotion are stopped in this way will be described with reference to FIG. 13, FIG. 14, and FIG. 15.

Figure 13:
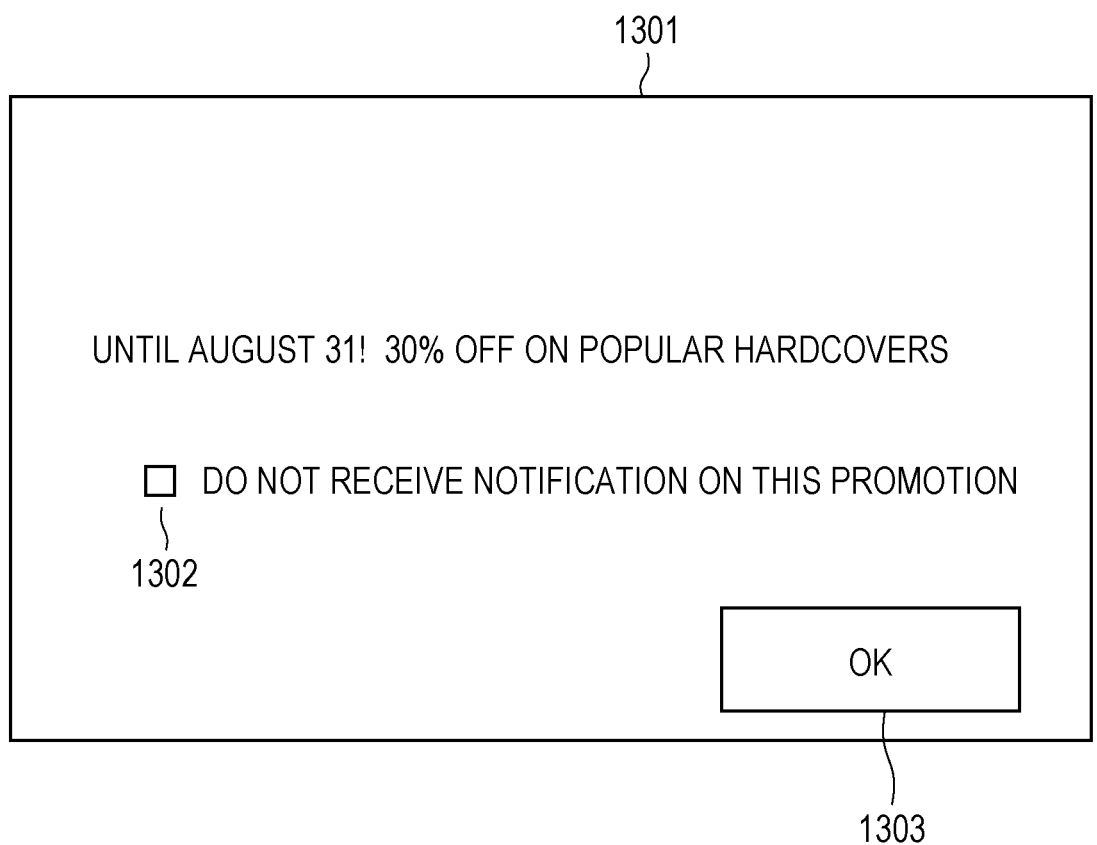
FIG. 13 is a view that shows the display of the push notification of the system.

FIG. 13 is a dialog 1301 that the OS 104 displays upon receiving a push notification. The dialog 1301 contains a checkbox 1302 for "DO NOT RECEIVE NOTIFICATION ON THIS PROMOTION". When an OK button 1303 is selected in a state where no checkmark is placed in the checkbox 1302, the intended application 105 is launched, and the details of the push notification are displayed. At this time, subsequent push notifications for the same promotion and push notifications for other promotions continue to be received. On the other hand, when the OK button 1303 is selected in a state where checkmark is placed in the checkbox 1302, subsequent push notifications for this promotion are stopped. At this time, push notifications for other promotions continue to be received. When the OK button 1303 is selected in a state where checkmark is placed in the checkbox 1302, the target application 105 may be launched or may be not launched. This action depends on the specifications of the application 105.

Figure 14:
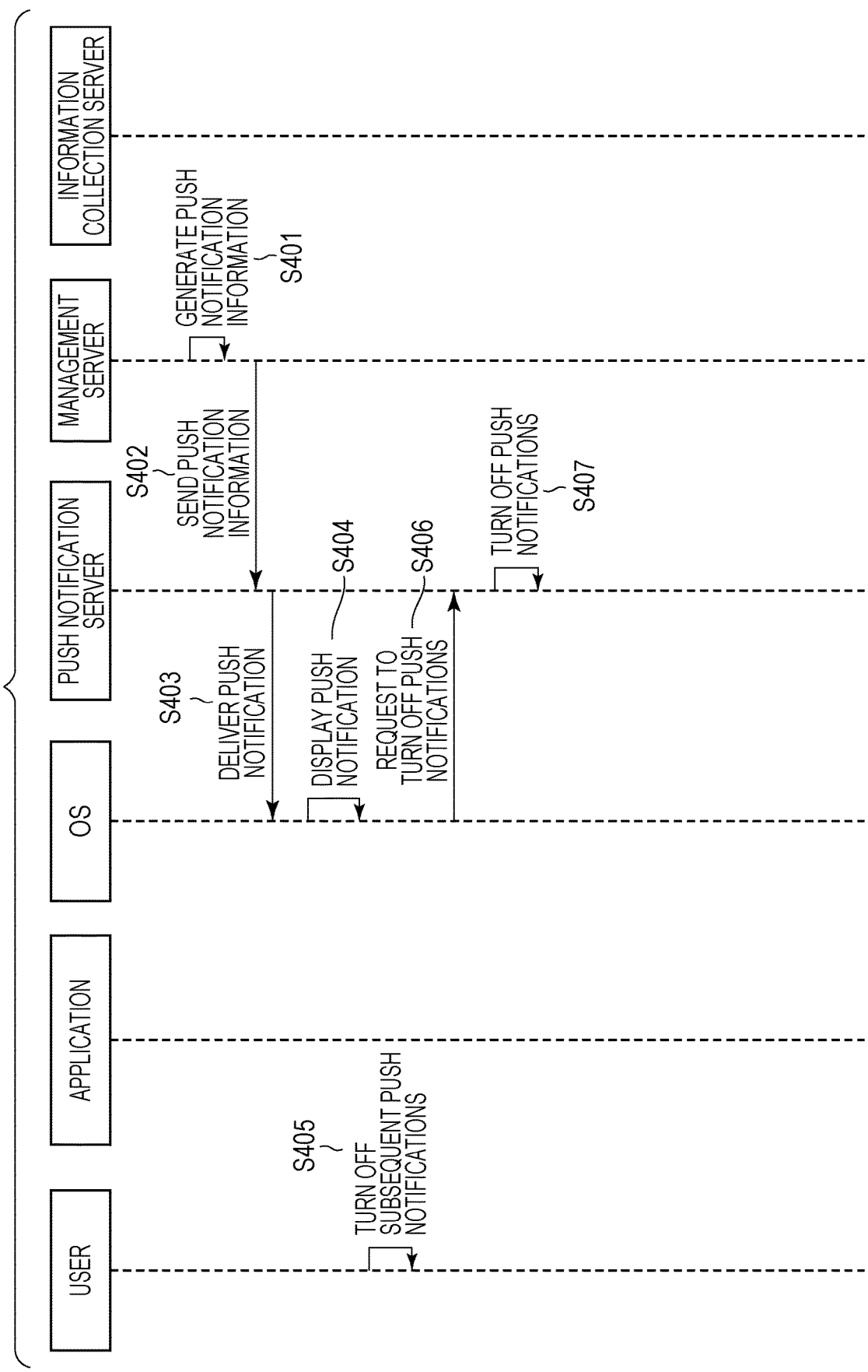
FIG. 14 is a sequence diagram of the system.

FIG. 14 is an example of a sequence to stop push notifications for an intended promotion. S401 to S403 are similar to S107 to S109, so the description thereof is omitted. The management server 101 generates push notification information as shown in FIG. 13 (that is, push notification information with which an option to stop push notifications in the future is displayed on the information processing device 110) in S401. In S404, the OS 104 displays the dialog 1301 shown in FIG. 13. In S405, a user places checkmark in the checkbox 1302 of the dialog 1301, and selects the OK button 1303. In S406, the OS 104 requests to turn off push notifications associated with the intended promotion to the intended terminal 110 from the push notification server 102. Information that is sent in S406 contains the device token of the source terminal 110 and the promotion ID together with instruction information to turn off push notifications. In S407, the push notification server 102 turns off push notifications associated with the intended promotion to the intended terminal 110 that has provided the information of S406.

Figure 15:
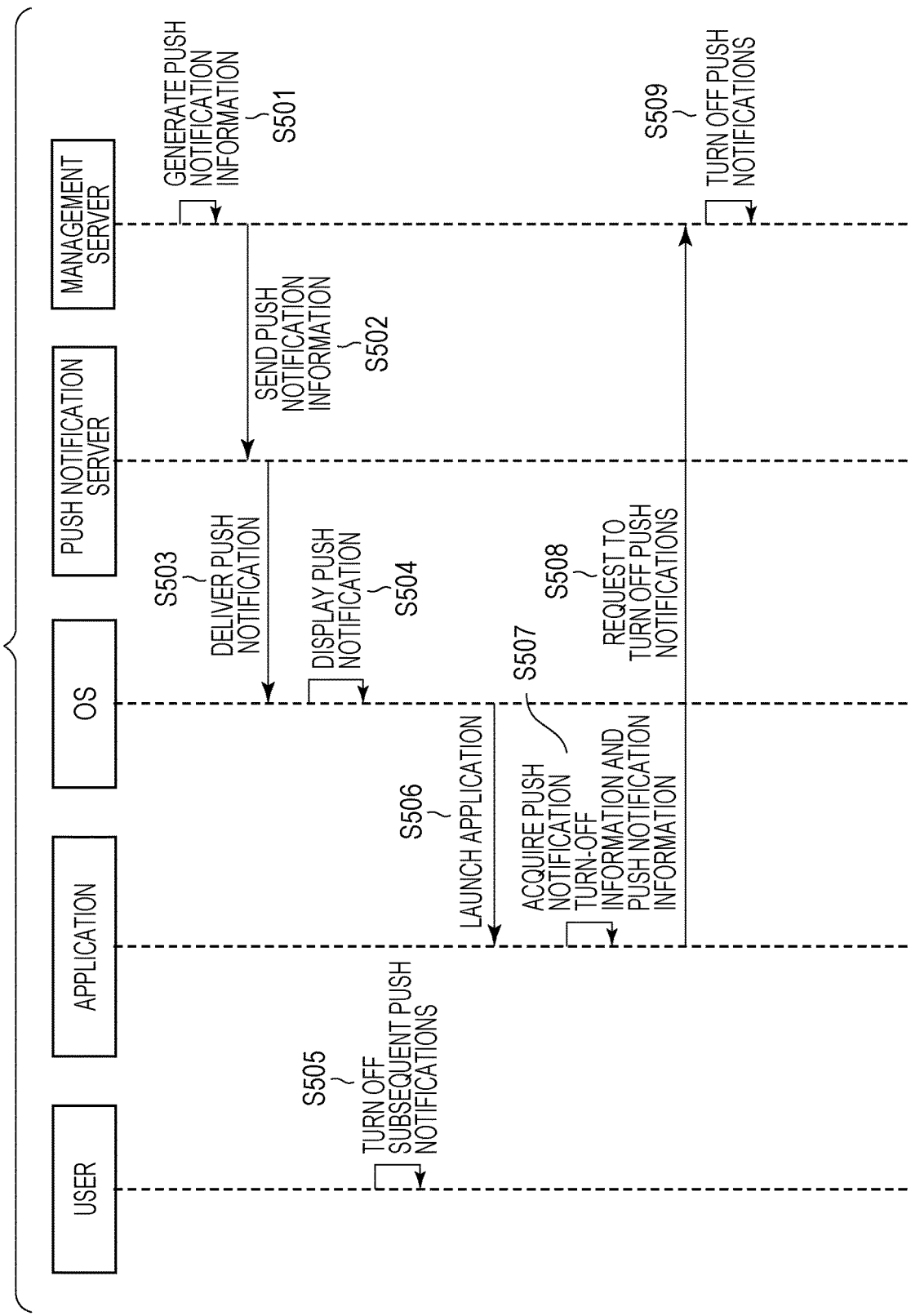
FIG. 15 is a sequence diagram of the system.

FIG. 15 is an example of a sequence to stop push notifications for an intended promotion. Different from FIG. 14, the application 105 requests to turn off push notifications from the management server 101. S501 to S503 are similar to S101 to S103, so the description thereof is omitted. In S504, the OS 104 displays the dialog 1301 shown in FIG. 13. In S505, a user places checkmark in the checkbox 1302 of the dialog 1301, and selects the OK button 1303. In S506, the OS 104 launches the application 105 based on the fact that the OK button 1303 is selected by the user. In S507, the application 105 acquires set information to turn off push notifications and push notification information. The application 105 is able to acquire this information via the API of the OS 104. When the application 105 has been already launched in the step of S506, the application 105 is not newly launched; however, the application 105 is able to receive set information to turn off push notifications and push notification information. In S508, the application 105 requests to turn off push notifications associated with an intended promotion to the intended terminal 110 from the management server 101. Information that is sent in S508 contains the device token of the source terminal 110 and the promotion ID together with instruction information to turn off push notifications.

In S509, the management server 101 stops sending push notifications associated with the intended promotion to the intended terminal 110. The application 105 is launched in S506. At this time, the application 105 is launched without showing a user interface, and may be exited after causing the management server 101 to turn off push notifications.

Through the above process, the present embodiment is able to execute a process of delivering push notifications based on user's intention.

Fourth Embodiment

Figure 16:
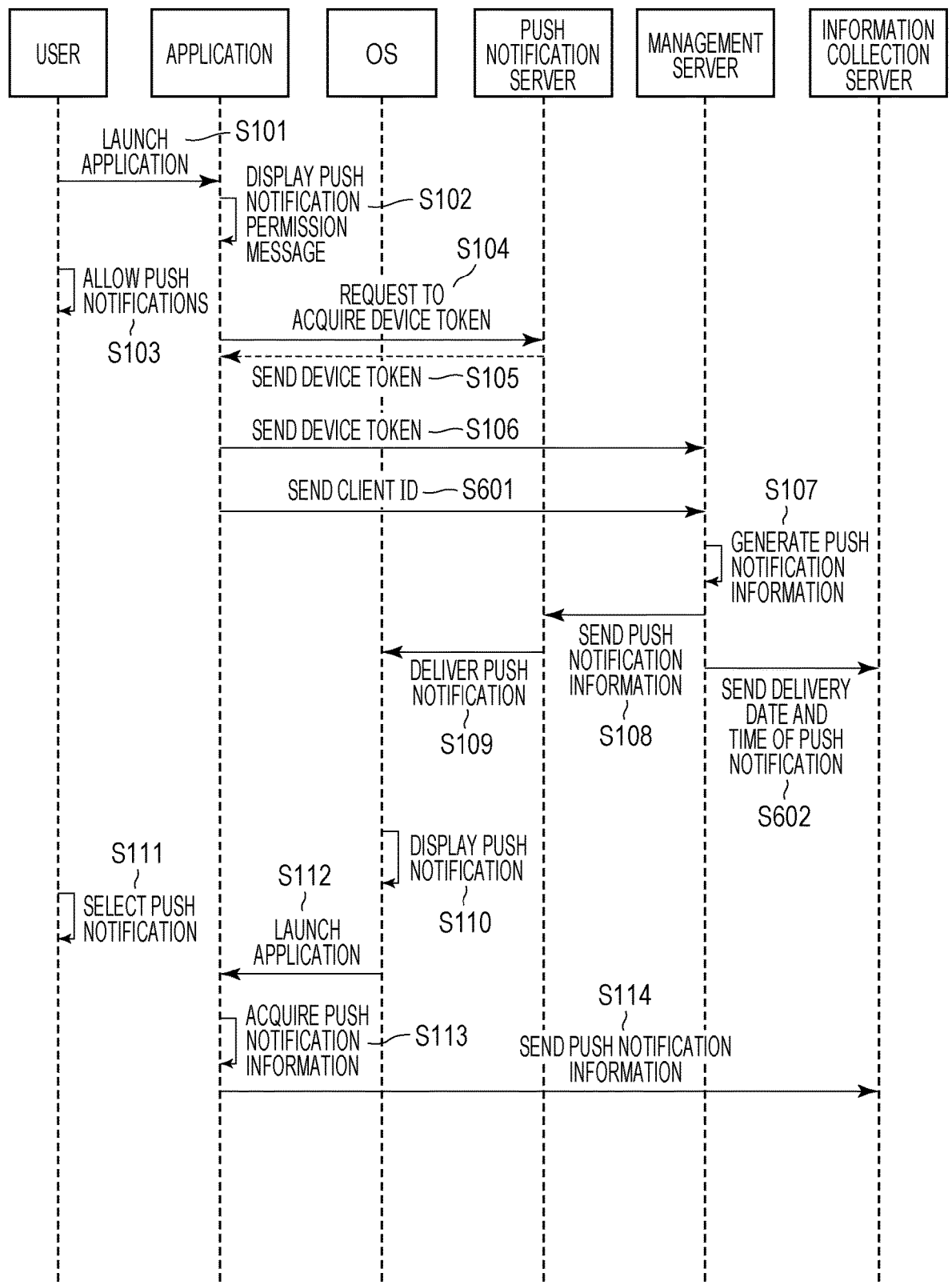
FIG. 16 is a sequence diagram of the system.

In the present embodiment, a method of sending, to the information collection server 103, the fact that a push notification has been delivered on a user-by-user basis or on a terminal-by-terminal basis will be described. The sequence of the method will be described with reference to FIG. 16. The processes of FIG. 16 differ from the processes of FIG. 2 in S601 and S602. In S601, the application 105 sends the above-described client ID to the management server 101. In S602, the delivery date and time of the push notification is sent to the information collection server 103 together with the client ID. Thus, the information collection server 103 is able to receive not only the notification open information of the push notification received in S114 but also the delivery date and time of the push notification. Thus, the information collection server 103 is able to count, on a client ID-by-client ID basis, the fact that a push notification has been delivered and the fact that the push notification has been opened. With this information, the information collection server 103 is able to count the number of users or terminals 110 to which a push notification has been delivered and that has not opened the push notification.

Fifth Embodiment

In the present embodiment, as shown in FIG. 17, the management server 101 enters (saves) "campaignId" and "notificationId" in a database in association with each other in S701. At this time, the push notification information that is generated in S107 needs to contain "notificationId" but need not contain "campaignId". Therefore, in S107 of the present embodiment, the management server 101 generates push notification information that contains at least "notificationId". In S114 of the present embodiment, the application 105 just needs to send push notification information that contains at least "notificationId" to the information collection server 103. That is, the push notification information that is sent in S114 need not contain "campaignId". At this time, the information collection server 103 is able to count the number of opened push notifications on a promotion-by-promotion basis based on the push notification information received in S114 and the association information of "notificationId" and "campaignId", saved in the database. That is, the information collection server 103 is able to identify a promotion ID associated with a notification ID by using the database and the notification ID that is identified by the response information of S114.

The database in FIG. 17 is illustrated as a component different from the management server 101 or the push notification server 102. Instead, the management server 101 or the push notification server 102 may hold the database. The database is illustrated in FIG. 17; however, "campaignId" and "notificationId" just need to be held in association with each other, and may be held in a file. In the present embodiment, the push notification information that is generated in S107 of FIG. 17 and the push notification information that is sent in S114 need not contain "campaignId". Instead, the push notification information that is generated in S107 of FIG. 17 and the push notification information that is sent in S114 may contain "campaignId".

In the present embodiment, the management server 101 saves a notification ID and a promotion ID in the database in association with each other. Therefore, for example, service providers can easily manage user operations on push notifications on a promotion ID-by-promotion ID basis.

OTHER EMBODIMENTS

In the above-described embodiments, the example in which a plurality of push notifications is provided for each promotion at different delivery dates and times is described; however, embodiments of the present disclosure are not limited thereto. For example, in other embodiments of the present disclosure, push notifications of different keys "notificationId" for one "campaignId" may be provided at substantially the same time. For example, in one example, information that contains "UNTIL END OF AUGUST! 30% OFF ON POPULAR HARDCOVERS" in push notification A and "HOLD SUMMER VACATION MEMORY IN ALBUM! 30% OFF ON POPULAR HARDCOVERS" in push notification B is provided. At the time that the push notification and the push notification B are provided, the push notification A and the push notification B have the same "campaignId" but have different keys of "notificationId". When embodiments of the present disclosure are applied to such a case, which push notification has been opened and which push notification has not been opened can be counted on a promotion-by-promotion basis. That is, in some embodiments, the present invention may be used to function as a test of push notifications.

In the above-described embodiments, push notifications regarding promotions are described as an example; however, embodiments of the present disclosure are not limited thereto. Embodiments of the present disclosure may also be applied to push notifications regarding maintenance information or other information of services, for example. In the above-described embodiments, push notification information contains a promotion ID and a notification ID. However, when some embodiments of the present disclosure are applied to push notifications regarding maintenance information or other information of services, push notification information contains, for example, a maintenance ID instead of a promotion ID. That is, push notification information contains, for example, a maintenance ID and a notification ID. Some embodiments of the present disclosure may be applied to push notifications regarding software updates. In this case, push notification information contains a software version ID and a notification ID.

In the above-described embodiments, the number of opened notifications is counted by the information collection server 103; however, embodiments of the present disclosure are not limited thereto. For example, in other embodiments, not only push notification information, but also the number of terminals to which a push notification is sent is sent from the management server 101, the push notification server 102, or the like, may be sent from the application to the information collection server 103. With this process, the information collection server 103 may measure the open rate.

In the above-described embodiments, the information collection server 103 and the management server 101 are different components. Instead, the management server 101 and the information collection server 103 may be made from one server. In the above-described embodiments, a service for a photo album is described as an example; however, the service is not limited thereto. The service may be another service.

The processes of the embodiments may be executed in combination as needed.

In the above-described embodiments, when the application 105 sends push notification information (for example, in S114), the destination is described as the information collection server 103. Instead, the destination may be the management server 101. Alternatively, the destination may be both the information collection server 103 and the management server 101.

The above-described embodiments are implemented by executing the following processes. That is, the process is a process in which software (program) that implements the functions of the above-described embodiments is supplied to a system or device via a network or various storage media and a computer (CPU, MPU, or the like) of the system or device reads and executes the program. A single computer may be caused to execute the program or a plurality of computers may be caused to execute the program in coordination with each other. The whole of the above-described process need not be implemented by software, and part or whole of the process may be implemented by hardware, such as ASIC. The CPU is not limited to a single CPU that executes the whole of the process but a plurality of CPUs may execute the process in coordination with each other as needed.

According to various embodiments of the present disclosure, it is possible to efficiently count user operations on push notifications.

OTHER EMBODIMENTS

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While embodiments of the present disclosure have been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2018-142388, filed Jul. 30, 2018, which is hereby incorporated by reference herein in its entirety.

What is claimed is:

1. A system comprising:
at least one information processing device; and
a management server,
the at least one information processing device including
at least one processor, the at least one processor of the at least one information processing device being configured to:
send, to the management server, predetermined information regarding an operation performed on a predetermined application regarding a photo album, wherein, in a case where a screen changing operation for a screen change to an online cart to pay for the photo album on the predetermined application is performed, the predetermined information is information that is based on performing the screen changing operation,
the management server including at least one processor, the at least one processor of the management server being configured to:
generate push notification information, that is based on the predetermined information, wherein, in a case where an order for creating the photo album is not placed although the screen changing operation has been performed, the management server is further configured to generate the push notification, and
send, to the at least one information processing device, the generated push notification information;
wherein the at least one processor of the at least one information processing device being further configured to:
execute display by a push notification based on the sent push notification information,
send, when a user operation is performed on display by the push notification, response information based on identification information contained in push notification corresponding to the push notification for which the user operation is performed.

2. The system according to claim 1, wherein the push notification information contains identification information of the at least one information processing device, and the identification information indicates a destination to which the push notification information is sent.

3. The system according to claim 2, wherein the push notification information contains at least one of date information on which the push notification is delivered and message information that is displayed on the at least one information processing device.

4. The system according to claim 1, wherein the at least one information processing device, to which the push notification information is sent, is determined based on the predetermined information.

5. A management server comprising:
at least one processor configured to:
receive, from the at least one information processing device, predetermined information regarding an operation performed on a predetermined application regarding a photo album, wherein, in a case where a screen changing operation for a screen change to an online cart to pay for the photo album on the predetermined application is performed, the predetermined information is information that is based on performing the screen changing operation,
generate push notification information that is based on the predetermined information, wherein, in a case where an order for creating the photo album is not placed although the screen changing operation has been performed, the management server being further configured to generate the push notification information that is based on non-placement of the order for creating the photo album although the screen changing operation has been performed,
send to the at least one information processing device, the generated push notification information, the held second notification information, and
receive, when a user operation is performed on display by the push notification, from the at least one information processing device, response information based on identification information contained in push notification corresponding to the push notification for which the user operation is performed.

6. The system according to claim 1,
wherein the management server is further configured to be able to generate first push notification information, second push notification information for notification of a campaign promotion that is identical to a campaign promotion notified using the first push notification information, and third push notification information for notification of a campaign promotion that is different from the campaign promotion notified using the first push notification information,
wherein, in a case where the first push notification information is sent, the at least one information processing device displays predetermined area for receiving a user operation for setting a refusal to receive the second push notification information, and
wherein the management server is set such that, when the user operation is performed in the predetermined area, the third push notification information is able to be sent to the at least one information processing device but the second push notification information is not sent to the at least one information processing device.

7. The system according to claim 6, wherein information for displaying the predetermined area is contained in the push notification information that is sent.

8. The system according to claim 6, wherein the predetermined area is contained in display by the push notification based on the first push notification information that is sent.

9. The system according to claim 1, wherein the predetermined application is launched in a case where the user operation is performed on display by the push notification based on the push notification information.

10. The system according to claim 1,
wherein the management server is further configured to be able to generate first push notification information, second push notification information for notification of a campaign promotion that is identical to a campaign promotion notified using the first push notification information, and third push notification information for notification of a campaign promotion that is different from the campaign promotion notified using the first push notification information, and
wherein a message in display by the push notification based on the first push notification information is different from a message in display by the push notification based on the second push notification information.

11. The system according to claim 1,
wherein the management server is further configured to be able to generate first push notification information, second push notification information for notification of a campaign promotion that is identical to a campaign promotion notified using the first push notification information, and third push notification information for notification of a campaign promotion that is different from the campaign promotion notified using the first push notification information,
wherein the second push notification information and the third push notification information are sent to the at least one information processing device in a case where the user operation is not performed on display by the push notification based on the first push notification information.

12. The system according to claim 1,
wherein the management server is further configured to be able to generate first push notification information, second push notification information for notification of a campaign promotion that is identical to a campaign promotion notified using the first push notification information, and third push notification information for notification of campaign promotion that is different from the campaign promotion notified using the first push notification information,
wherein the first push notification information, the second push notification information, and the third push notification information contain, at least, a first type of the identification information, which differs from one campaign promotion to another campaign promotion notified using push notification information, and a second type of the identification information, which differs from the push notification information to the push notification information,
wherein content of the first type of the identification information contained in the first push notification information is identical to content of the first type of the identification information contained in the second push notification information,
wherein content of the first type of the identification information contained in the third push notification information is different from content of the first type of the identification information contained in the first push notification information and content of the first type of the identification information contained in the second push notification information, and
wherein content of the second type of the identification information contained in the first push notification information, content of the second type of the identification information contained in the second push notification information, and content of the second type of the identification information contained in the third push notification information are different from one another.

13. The system according to claim 1,
wherein the management server is further configured to be able to generate first push notification information, second push notification information for notification of a campaign promotion that is identical to a campaign promotion notified using the first push notification information, and third push notification information for notification of a campaign promotion that is different from the campaign promotion notified using the first push notification information, and
wherein the at least one processor of the management server is further configured to:
set the management server such that, when the user operation is performed on display by the push notification based on the first push notification information, the third push notification information is able to be sent to the at least one information processing device but the second push notification information is not sent to the at least one information processing device.

14. The system according to claim 1, wherein, in a case where an operation for seeing a price of the photo album is performed on the predetermined application, the predetermined information is information that is based on performing the operation for seeing the price of the photo album.

15. The system according to claim 1, wherein, in a case where an operation for displaying an editing screen for the photo album is performed on the predetermined application, the predetermined information is information that is based on performing the operation for displaying the editing screen for the photo album, and the push notification information that is based on the predetermined information is the push notification information regarding how to perform an editing operation.

16. The system according to claim 1, wherein, in a case where the screen changing operation is performed, the push notification information that is based on the predetermined information is the push notification information that includes a promotion code.

* * * * *